United States Patent Office 2,782,123
Patented Feb. 19, 1957

2,782,123
SWEETENING AGENT AND METHOD OF PREPARING THE SAME

Martin Rubin, Silver Spring, Md.

No Drawing. Application June 4, 1954,
Serial No. 434,675

12 Claims. (Cl. 99—141)

The present invention relates to a novel natural sweetening agent and to the method of preparing the same. More particularly, the invention relates to the products of partial degradation of certain naturally occurring polysaccharide materials which are potential sweetening agents. The invention relates to a product of partial degradation of an extract or juice derived from the tubers of the Jerusalem artichoke plant (*Helianthus tuberosus*) which possesses the property of developing enhanced sweetness, in situ, by the application of heat thereto.

The palatability and attractiveness of many foodstuffs depend upon their sweetness. The primary sweetening agents in nature are the carbohydrates, especially sucrose, glucose, and fructose. Tremendous quantities of these agents are used for the purpose of imparting sweetness to foods. The fructose in such cases is derived largely from invert sugar.

For some applications, the use of these carbohydrates in their commercial forms has disadvantages. For example, in foods which are to be eaten in conjunction with regimes for reduction of weight, the so-called low-calorie diets, the presence of the amount of carbohydrate needed to provide a sweet taste to the food increases the caloric value beyond permissible levels. Likewise, in cases of diabetes, the addition of the naturally occurring sweetening agents of the type presently available raises the carbohydrate level of the food to the point where it may not be suited for the diet of persons with this disease. The tolerance of diabetic patients toward fructose in its various forms, however, is greater than toward other sugars.

Intensive efforts have been made to avoid these difficulties by the provision of synthetic sweetening agents, intended to impart sweetening effects without increasing the carbohydrate burden of the food products. Among the compounds which have come into wide use are primarily the chemicals saccharin, and cyclohexyl sodium sulfamate ("Sucaryl"). The use of these agents is attended by serious disadvantages. For one thing, these materials are wholly synthetic and hence foreign to the natural processes of the body metabolism. Serious concern has been expressed concerning the possible long-range toxic effects of these substances on human beings. This problem is of sufficient gravity to have evoked official consideration by the Federal Government through the appointment of an investigative board to examine the question in detail. In addition, there is a practical problem which has tended to limit acceptance by the general consuming public of the synthetic sweetening agents. It is well-known that the use of synthetic sweeteners may result in a bitter after-taste to the user. This unpleasant effect is aggravated by the fact that in practical applications the incorporation of synthetic sweetening agents in prepared foods presents a difficult technical problem. Uniformity of mixing in baked goods is extremely difficult to attain, with some portions of a batch proving to be extremely sweet, while other portions are tasteless.

In the field of natural saccharine materials, neither the use of fructose nor of inulin has proved to be advantageous. The chemical reactivity of fructose makes it easily destroyed by heating or as a result of condensation with other naturally occurring materials. Hence, in order to achieve even a moderate degree of final sweetness in a prepared food, a great excess of fructose is needed to compensate for losses during food preparation. At the same time, caloric values are being retained. The amount of fructose needed for sweetening may therefore be undesirable.

Neither has the use of inulin itself as a sweetening agent proved practical, the amounts required to achieve sweetness being excessive. The use of plant roots containing inulin tends to impart a special flavor to foods which does not always meet with consumer approval.

In contrast to the methods and products of the prior art, the sweetening agent of the present invention results from a wholly different approach to the problem of utilization of naturally occurring polysaccharides, and possesses sweetening properties which, when developed in accordance with the methods disclosed, are entirely unexpected in their power, intensity and efficiency.

The naturally occurring polysaccharides which are preferred as the source of the sweetening agent prepared therefrom according to the invention are those obtainable from the tubers of the Jerusalem artichoke plant. One method of separating or extracting the polysaccharides is by means of extraction with hot water. The tubers of the Jerusalem artichoke, when freshly harvested, contain up to about 20 percent (on the wet basis) of carbohydrate materials.

The freshly harvested root exhibits poor keeping qualities as such because of enzymes naturally present, and must therefore be promptly utilized for extraction, or else dried. On the other hand, the tuber when dehydrated may be kept for long periods without deterioration or substantial loss of carbohydrate content. For the purposes of the present invention, there can be utilized not only freshly harvested tubers, but the dehydrated form as well.

Where freshly harvested root is used, the crop is cleaned of adhering dirt in the customary manner. The roots may then be comminuted into small pieces, such as, for example, one-sixteenth inch cubes. The carbohydrates or polysaccharide materials may be separated from the root material either in the form of expressed juices, or preferably by extraction with hot water, in which they are soluble. The aqueous extraction may also be carried out by diffusion methods.

For example, the natural polysaccharides required for the preparation of the new sweetening agent may be separated from the tubers by heating three pounds of freshly harvested roots with 3 liters of water at close to boiling point. The extraction process is continued for three hours, when the supernatant solution is mechanically separated. The root residue is further extracted with one liter of water, and the first and second extracts are combined.

Alternatively, there may be utilized for this stage of the sweetening agent preparation process, one pound of ground dehydrated artichoke root. This eliminates the necessity for processing of the freshly harvested root within one week following its removal from the ground to avoid spoilage. Such dehydrated artichoke flour may be stored advantageously even as long as two years after its preparation, particularly when it is stored in sealed cans, at room temperature.

In prior art methods of extraction of artichoke tubers, it had been customary to add milk of lime or calcium carbonate as a buffering agent, followed by addition of oxalic acid to remove excess calcium. In another method of obtaining inulin extract, lead salts such as lead acetate were added to remove protein, followed by removal of the lead with disodium phosphate or ammonium oxalate. The risks of toxicity in working with these hazardous substances due to incomplete removal eliminates them from practical consideration in preparing a sweetening agent for food use, and it has been found that the use of these reagents is unnecessary for the successful application of the new method. In carrying out extractions of polysaccharide materials according to the method of this invention, not only hot water or boiling water may be used, but also water heated under pressure (superheated) to temperatures above the atmospheric boiling point.

The aqueous extract of artichoke root containing the polysaccharide materials obtained as described above serves as a starting point for the preparation of the natural sweetening agent of this invention.

By suitable treatment of the extract with acids, as disclosed more fully below, transformations are brought about in the polysaccharide materials derived from the natural plant which result in their conversion into potential sweetening agents of great intensity and efficiency. The nature of the products resulting from the acid treatment of the original polysaccharide materials is not definitely known. The fact that the products of acid treatment, whether in the form of solution, syrup, or dried powder, are not of themselves sweet, suggests that they are not, to any significant extent, composed of monosaccharides. Their inherent sweetening power is potential and must be developed further when they are utilized as sweeteners. Thus, for example, the remarkable sweetening power of these products may be developed in situ, in the course of heat treatment of suitable character, when the products are applied in the preparation of various processed foods, such as preserved or baked goods.

While it is not necessary to be bound by any particular theory, it is believed that the acid treatment of the polysaccharide materials derived from the plant tubers results, under the conditions adopted in this invention, in the formation of fragments or partial degradation products, of intermediate molecular weight, which have negligible sweetness in themselves, but which are readily convertible by heating and other means into agent of extraordinary sweetness.

The following example illustrates a preferred method of carrying out the acid treatment of the polysaccharide materials in accordance with this invention:

*Example I*

The aqueous extract of polysaccharide materials obtained from the Jerusalem artichoke tubers as previously described and having an optical rotation to the sodium D line in a 0.5 dm. polariscope tube at room temperature of $+0.5°$, which may be either neutral, faintly acid or faintly alkaline, is strongly acidified as by gradual addition, with stirring, of 20 ml. of concentrated hydrochloric acid, to the total extract volume of 4 liters. The acidified solution is then warmed to 90° C. for a period of one-half hour. During this time the optical rotation of aliquot samples of the solution changes from $+0.5°$ to $-0.6°$. When this point is reached, the solution is cooled to room temperature and the excess of mineral acid is neutralized by addition of solid calcium carbonate. The neutralized solution is clarified by filtration or centrifugation and is ready for use as a sweetening agent as described below.

The degree of transformation of the starting extract cited in the foregoing example corresponded to about 30 percent of that which would have been possible had the reaction been permitted to go to the final completion. This was determined by separately allowing an aliquot portion of the acidified solution to continue its conversion until substantial constancy of the optical rotation reading indicated that the reaction had ceased. For the particular quantities of material utilized above the point of completed conversion was attained at an optical rotation of $-2.5°$. Thus, arresting the reaction at an optical rotation of $-0.6°$ indicated roughly that the reaction had proceeded about one-third of the way to completion. Obviously, by stopping the reaction at other stages, various degrees of conversion may be achieved. For the purpose of utilization of the solution as a sweetening agent, the limits of utility of the conversion reaction have been established as between 25% and 85% of complete conversion.

The rapidity of the conversion reaction is directly related to the acidity (pH) of the solution and to temperature, and increases as pH is lowered and temperature increased. While the most rapid and optimum results were obtained when the pH was lowered to from 1 to 2, the process can also be advantageously carried out at higher pH values ranging up to 5. At these higher values, however, the reaction proceeds slowly. Thus, at a pH of 4 brought about by the addition of 85% phosphoric acid the conversion reaction for the solution used in the foregoing example required about 2 hours.

In place of hydrochloric acid or phosphoric acid, other mineral acids, such as sulfuric acid, carbonic, and sulfurous acids, as well as readily hydrolyzable salts of weak bases and strong acids, such as sodium bisulfate or sodium dihydrogen phosphate may be used. There may also be used organic acids, such as, for example, acetic, citric and tartaric acids. It is preferable to use as acidifying agents those acids whose anions can be removed after hydrolysis by formation of insoluble compounds upon neutralization, as for example, calcium compounds. It is also within the scope of this invention to use acids whose presence in the final product is compatible with the food use of the materials of this invention. The use of phosphoric acid is advantageous in providing a buffering action, as well as desirable phosphate ions which may be useful in food fortification.

As a neutralizing agent and for purposes of arresting the reaction, there may be employed in place of the calcium carbonate, other alkalis and alkaline salts, such as lime, dilute sodium hydroxide or potassium hydroxide solutions. By the use of stoichiometric quantities of base as calculated from the amount of acid used initially it is possible to eliminate final filtration of the hydrolyzed solution. In the use of soluble alkalis for neutralization, attention must be given to the possibility of added salt content attributable to the neutralization. In some instances, the enhanced sweetening effect of the new solutions prepared by my method may be equivalent to as much as 25 times the sweetness of sucrose in actual use. It may be noted that the sweetening agent thus produced is not particularly sweet in itself but only exhibits its remarkable sweetening effect on heating or equivalent processing in connection with food processing.

By suitable treatment of the solution prepared as described in the foregoing example, I have been able to modify the volume to permit flexibility in the application of the product as a sweetening agent. Thus, concentration by evaporation by conventional methods may be employed to obtain a syrup especially suitable for use in the preparation of jams and jellies. Alternatively, the concentration process may be carried on during the conversion operation by raising the temperature of the mixture to the boiling point, or by lowering the pressure in order to maintain the temperature of the conversion mixture at a predetermined temperature.

The converted product may be obtained in the form of a powder by application of spray drying techniques. In this form, the sweetening agent has particular utility as an ingredient in dry mix baking preparations. The preparation of preformed cake and biscuit mixes by this means has proved especially useful and important.

The application of the sweetening agent of this invention in the development of sweetness in situ in processed foods and baked goods is illustrated by the following example:

Example II

A solution of 30 percent converted polysaccharide, equivalent to one-half pound of dehydrated Jerusalem artichoke root or to three pounds of freshly harvested root was added to the following baking mixture:

60 lbs. high gluten flour
75 lbs. whole eggs
40 lbs. cottonseed oil
20 lbs. water The mixture was baked in the usual manner. The resulting product was a pleasantly sweet, even flavored, well-textured biscuit. To obtain a comparable degree of sweetness in a mixture using the same quantities listed above required (in a separate experiment) the addition of 25 pounds of sugar in place of the extract of one-half pound of dried root powder above described. Alternatively, a comparable sweetening effect using a synthetic sweetener, would require, for example, the addition of one and one-quarter ounces of saccharin to the mix.

A matter of considerable significance is the negligible change in caloric value brought about by the addition of the sweetening agent of this invention, used as described above. By total combustion it was determined that 100 grams of product baked as described had a caloric value of 586. The same baking mixture without the addition of the sweetening solution had a caloric value of 578 per 100 grams. The difference due to the addition of the sweetening agent is thus minimal.

The products of this invention may be used for the sweetening of any processed food providing a substantial amount of heat is used in the processing thereof. As for example, the sweetening products may be used in the manufacture of baked goods, candy and confectionery, in preservation of fruits, and for cooking purposes. They are of great value in the sweetening of heat processed foods for diabetics. Depending upon the nature of the end use of the sweetening agent of this invention, varying amounts of converted extract, and extracts representing varying degrees of conversion may be used. For materials that may be subjected to only a moderate degree of heating, such as fruit prepared for canning in diabetic foods, it has been found best to utilize a more highly converted preparation of the order of 80 percent of total conversion.

While a preferred embodiment of the invention has been presented, it is to be understood that changes in materials, procedure and usage may be made therein without departing from the spirit and scope of the disclosed invention.

I claim:

1. The process of treating plant juices derived from Jerusalem artichoke tubers to obtain a sweetening agent therefrom which comprises treating the juices with an acid at an elevated temperature until the conversion is from 25% to 85% complete.

2. The process of treating plant juices derived from Jerusalem artichoke tubers to obtain a sweetening agent therefrom which comprises treating the juices with an acid at an elevated temperature until the conversion is from 25% to 85% complete, neutralizing the solution, and clarifying the resultant liquid.

3. The process of treating plant juices derived from Jerusalem artichoke tubers to obtain a sweetening agent therefrom which comprises treating the juices with an acid at an elevated temperature until the conversion is from 25% to 85% complete, and concentrating the solution to a syrup.

4. The process of treating plant juices derived from Jerusalem artichoke tubers to obtain a sweetening agent therefrom which comprises treating the juices with an acid at an elevated temperature until the conversion is from 25% to 85% complete, and drying the resulting solution to a powder.

5. The process of treating an aqueous extract of Jerusalem artichoke tubers to obtain a sweetening agent therefrom which comprises heating the extract with a mineral acid at a pH of from 1 to 5 until the conversion is from 25% to 85% complete.

6. The process of preparing a natural sweetening agent which comprises extracting the tubers of Jerusalem artichokes with hot water, heating the extract with hydrochloric acid at a pH of from 1 to 2 to a point where the conversion is approximately 30% complete, neutralizing the solution with calcium carbonate, and clarifying the liquid.

7. The process of preparing sweetened foods which comprises heating plant juices derived from Jerusalem artichoke tubers with an acid until the conversion is from 25% to 85% complete to form a sweetening agent, adding the sweetening agent thus formed to a food product, and heating the mixture of the sweetening agent and the food product to impart sweetness to the food.

8. The process of preparing sweetened baked goods which comprises heating plant juices derived from Jerusalem artichoke tubers with an acid until the conversion is about 30% complete to form a sweetening agent, adding the sweetening agent thus formed to a baking mixture, and heating the mixture and the sweetening agent to complete the baking and to impart sweetness in the baked goods.

9. A natural sweetening agent comprising partially degraded polysaccharide materials derived from Jerusalem artichoke tubers.

10. A heat-treated foodstuff sweetened with a partially degraded plant juice material derived from Jerusalem artichoke tubers, the desired degree of sweetness being imparted during the heat treatment of the foodstuff.

11. A natural sweetening agent comprising partially degraded polysaccharide materials derived from Jerusalem artichoke tubers, said partially degraded materials representing a conversion of from 25% to 85%.

12. A natural sweetening agent comprising partially degraded polysaccharide materials derived from Jerusalem artichoke tubers, said partially degraded materials representing a conversion of from 25% to 85%, resulting from acid hydrolysis.

References Cited in the file of this patent

UNITED STATES PATENTS

| 1,616,170 | Arsem | Feb. 1, 1927 |
| 1,763,080 | Arsem | June 10, 1930 |

FOREIGN PATENTS

| 272,876 | Great Britain | Dec. 22, 1927 |